United States Patent [19]
Osipchuk

[11] Patent Number: 5,610,730
[45] Date of Patent: Mar. 11, 1997

[54] LOW-COST HIGH-RESOLUTION DIGITAL SCANNING CAMERA

[76] Inventor: Yuri V. Osipchuk, 2013 B Los Trancos, Irvine, Calif. 92715

[21] Appl. No.: 291,138

[22] Filed: Aug. 16, 1994

[51] Int. Cl.$^6$ ...................................... H04N 7/14
[52] U.S. Cl. ................ 358/494; 348/203; 364/708.1
[58] Field of Search ................... 358/412, 413, 358/415, 418, 471, 474, 479, 482, 483, 494; 345/901, 905; 364/708.1, 709.11, 709.01; 348/205, 195, 202, 203, 551; H04N 7/14

[56] References Cited

U.S. PATENT DOCUMENTS 4,712,142  12/1987  Tomita et al. ................. 358/494
5,450,127  9/1995  Shimizu ........................ 348/205

FOREIGN PATENT DOCUMENTS 0070314  3/1994  Japan .................. H04N 7/14

OTHER PUBLICATIONS

Simms, T "The application of CCD's to document Scanning" Microelectronics vol. 7, No. 2 pp. 60–63 Dec. 1975.

Primary Examiner—David E. Harvey
Attorney, Agent, or Firm—John R. Ross

[57] ABSTRACT

A low-cost, high-resolution digital scanning camera for obtaining a digital image of objects within a field of view. Light from the objects in the field of view is reflected off a pivoting mirror through a focusing lens onto a linear CCD image sensor. The linear CCD image sensor provides the horizontal scan. A pivot means pivots the mirror to provide the vertical scan. A computer means converts the output of said CCD image sensor into an image of said objects in said field of view.

9 Claims, 3 Drawing Sheets

LOW-COST HIGH-RESOLUTION DIGITAL SCANNING CAMERA

This invention relates to imaging devices and in particular to digital scanning cameras.

BACKGROUND OF THE INVENTION

Scanning cameras are well known and many types are currently available. These are devices which examine an area or region point by point in a continuous systematic manner, repeatedly sweeping across until the entire area or region is covered. These cameras typically scan point by point in a direction (e.g., a horizontal direction) to produce a line of data then repeat the scan along additional lines until a field of view has been completely scanned. Data collected might be in analog or digital form. The data typically is then converted to some kind of gray scale, color scale or black and white pattern and displayed such as, for example, on a monitor or a sheet of paper.

SUMMARY OF THE INVENTION

The present invention provides a low-cost, high-resolution digital scanning camera for obtaining a digital image of objects within a field of view. Light from the objects in the field of view is reflected off a pivoting mirror through a focusing lens onto a linear CCD image sensor. The linear CCD image sensor provides the horizontal scan. A pivot means pivots the mirror to provide the vertical scan. A computer means converts the output of said CCD image sensor into an image of said objects in said field of view.

DETAILED DESCRIPTION OF PREFERRED EMBODIMENTS

Prototype Device

Figures 1A, 1B:
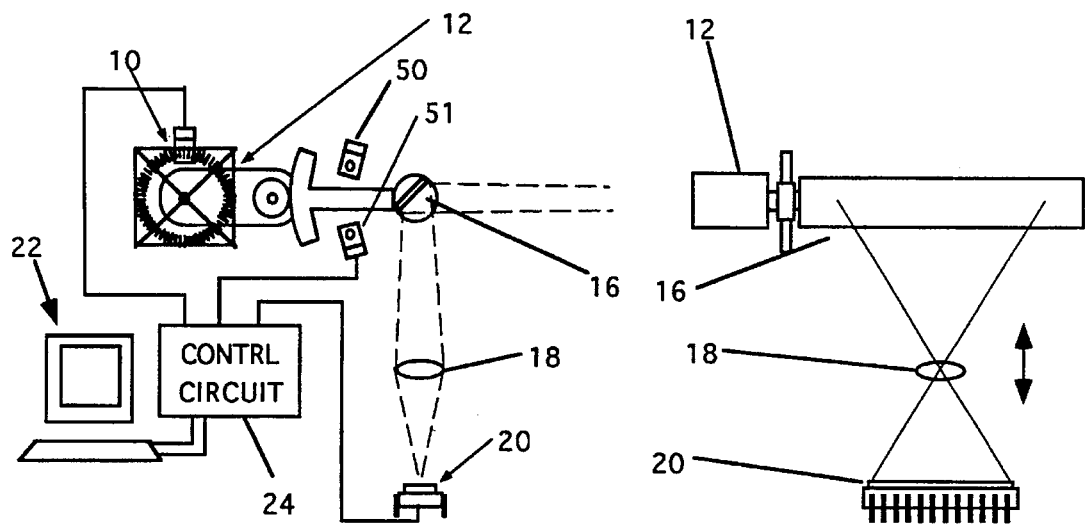
FIGS. 1 A, 1B and 2 are views of a preferred embodiment of the present invention.

A prototype working model of the present invention has been built by the Applicant using off-the-shelf parts to prove some of the advantages of the present invention over prior art devices. This prototype embodiment can be described by reference to the figures. The principal parts of this particular embodiment is shown in FIGS. 1A and 1B. This prototype camera uses a linear CCD image sensor 20 taken from a Saggita Gray hand held scanner, distributed by Qtronix. This image sensor has 3304 pixels, each pixel having an effective length of 10.7 μm so that the total length of the CCD linear image sensor is about 35.4 mm.

A lens 18 is a 38 mm objective lens taken form an AF35 Cannon 35 mm photo camera. This lens provides a 48 degree field of view in a horizontal direction. This field of view is focused on the linear CCD array. This objective lens can be focused manually for objects at distances from 300 mm to infinity. Focusing is accomplished in this embodiment by moving lens 18 as shown in FIG. 1B.

A rectangular mirror 16 with dimensions of 12.7 mm×80 mm with external coating (taken from a laser printer) was mounted on a head positioning mechanism taken from a hard disk drive (Model SDT251, Seagate). This mechanism provides for pivoting movement about an axis parallel to the long dimensions of the mirror. The mirror is positioned 100 mm from the center position of objective lens 18 which is located at 38 to 40 mm from CCD sensor 20.

A servo motor 12 from a radio controlled model car (FP-S28, Futaba), together with its gear box, was used to pivot the mirror. Pivoting from start to stop position (−8 degrees to +8 degrees) takes 5 seconds. A pair of electro-optic end position sensors 50 and 51 (as available from Radio Shack), together with circuitry from the servo motor was used to limit the movement of the mirror between plus and minus 8 degrees providing a 32 degree field of view in the vertical direction.

An optical rotary interrupter 10 (which is a plastic disk with 50 slits together with a light emitting diode and a photosensor) all from a PC mouse input device (supplied by Logitech) was mounted on the rotor of the servomotor. This interrupter provided electrical pulses every 0.000683 degrees (16 degrees/2340) of mirror rotation angle. Output from this interrupter was connected to the line counter input of the scanner control circuit 24.

The scanner equipment was controlled by an IBM compatible PC 22. Software used for this prototype is the same software available with the Saggita Gray hand held scanner.

Pivot Motor Control Circuit

Figures 4, 5:
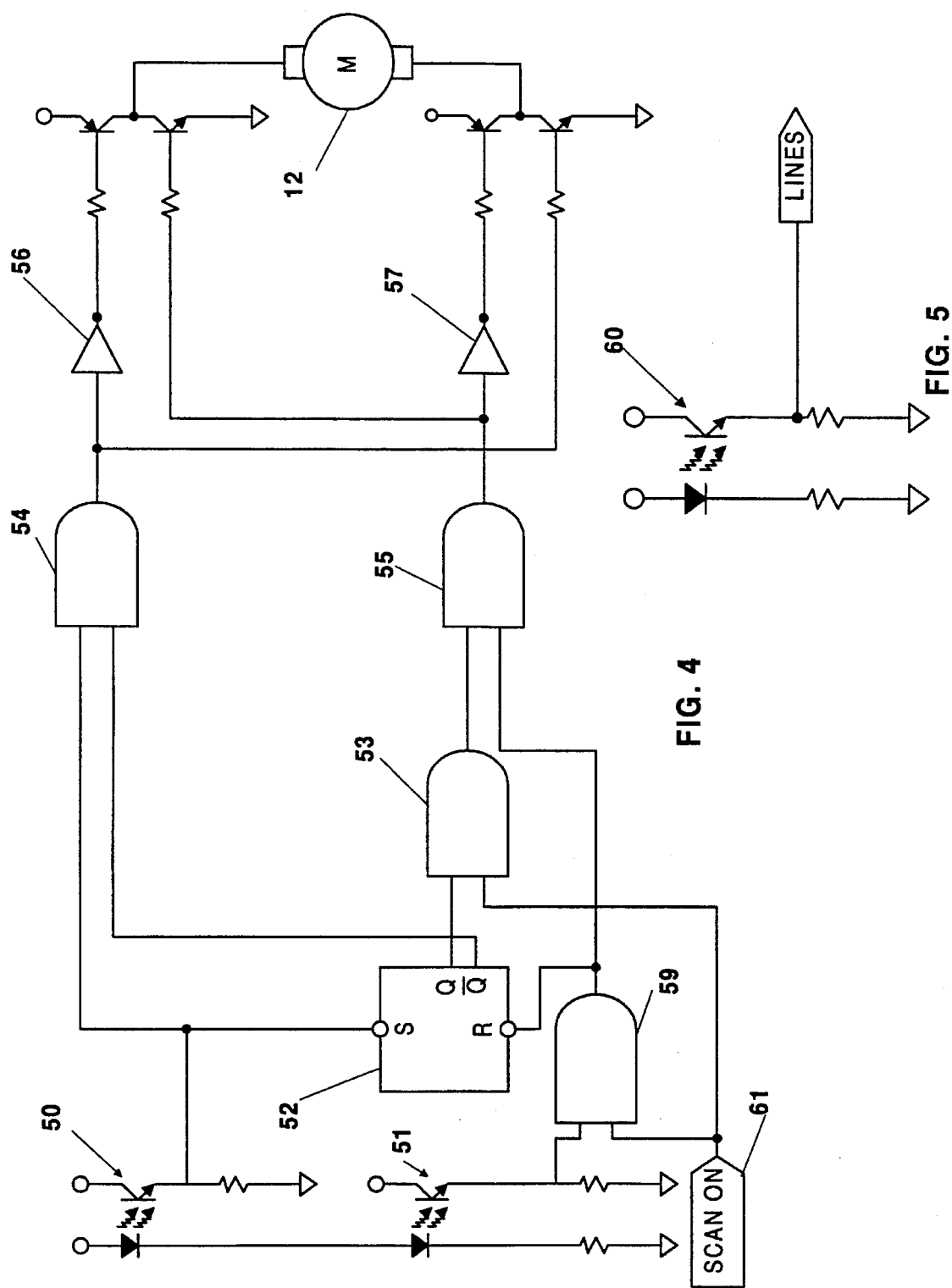
FIG. 4 is a circuit diagram for a prototype embodiment of the present invention.
FIG. 5 shows an electro-optical sensor initiating line scans.

The control circuit for the pivot motor 12 is shown in FIG. 4. Electro-optic backward end sensor 50 detects the end of mirror 16's backward movement when an interrupter flap attached to the mirror blocks the light form the LED to the photo-detector. Detector 50 signals that the mirror is ready for another scan by sending a low signal to flip-flop trigger 52. Flip-flop trigger 52 switches high voltage between $\bar{Q}$ and Q upon receipt of a high to low input. Thus, trigger 52 applies a high signal at one of the inputs to AND gate 53. When the operator of the camera is ready for a scan, he signal for the scan by typing a "CTRL A" on the keyboard of computer 22 which turns on scan on light 61. This sends a second high signal to AND gate 53 which in turn sends a high signal to AND gate 55. A second high signal is sent to AND gate 59. Another high signal is provided to AND gate 59 by electro-optic forward end sensor 51. These two high signals at gate 59 produces a high output from AND gate 59 to provide a second high signal to gate 55 to produce a high signal to driver 57 which drives servo motor 12 in a forward direction. When the scan is complete or if the optical path is interrupted in electro-optic forward end sensor, a low input is provided at AND gate 59 which provides low signals to AND gate 55 which stops the power to motor 12 and to trigger 52 which switches high output from AND gate 53 to AND gate 54. Since optical path in electro-optical backward end sensor 50 is now not interrupted the output from sensor 50 is high so that AND gate 54 provides a high signal to driver 56 driving servo motor 12 in the reverse direction until the backward end position is reached which decreases the output from sensor 50 to zero to set the system up for another scan.

FIG. 5 shows the method by which electro-optical sensor sends signals to the scanner equipment as optical rotary interrupter permits optical signals to be transmitted between the LED and the detector in lines sensor 60.

Collecting the Image

Utilizing the software of the Saggeta Gray scanner, a scan is initiated by typing "CTRL A" on the keyboard of PC 22. This starts the rotation of servo motor 12 from its start position (of −8 degrees) to the stop position (of +8 degrees) generating electrical pulses every 2.1 milliseconds (5 seconds/2340). Each pulse initiates the collection of a line of CCD data. Total resolution of the image thus is 3304×2340 pixels. After completion of a scan, the servo motor is automatically reversed by its control circuit and rotated backward to its start position ready for the next scan. The digital line scan data are collected by PC 24, and PC 24 converts the data into a complete image using the Saggita Gray software.

Operation of the Camera

Figure 2:
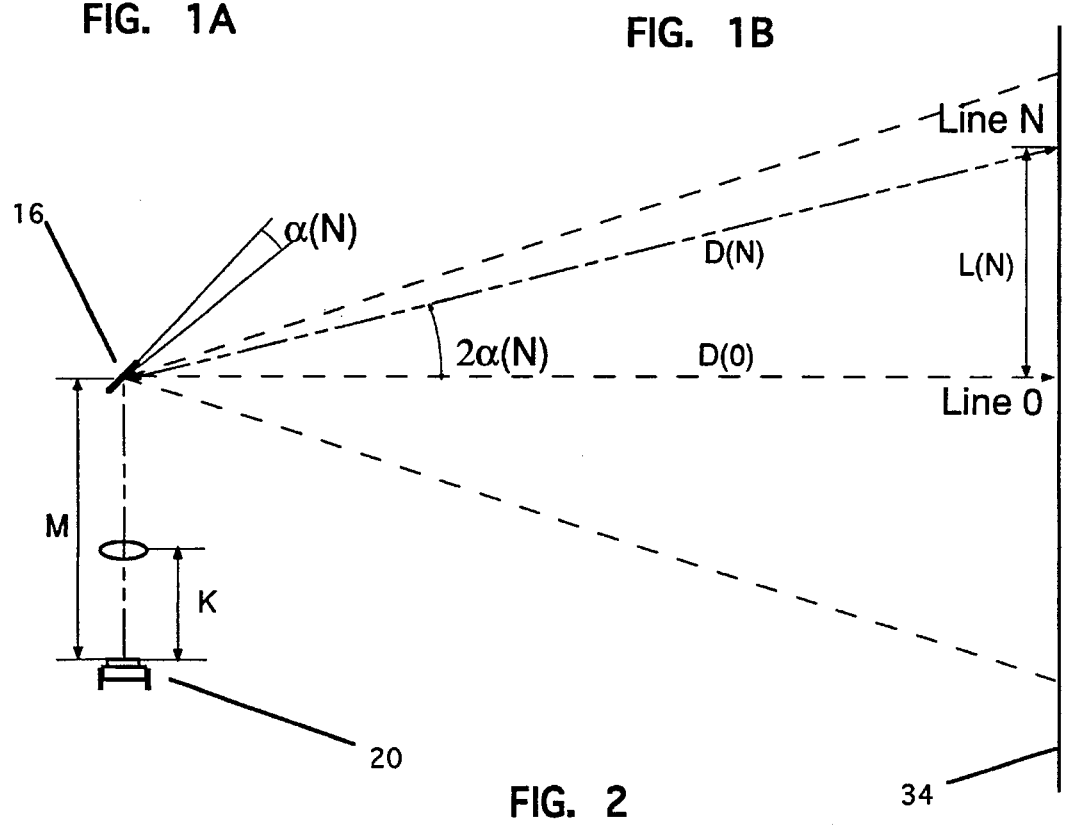

FIG. 2 shows this prototype device in use to record a white board 34 presentation. In this case the scanner is positioned about 10 feet from the white board and the camera is focused at 10 feet. My prototype device produces excellent images of both the white board display and the person making the presentation. Printing 0.5 cm high is clearly readable from the monitor of PC 24 and from an 8.5×11 inch printout produced by PC 24 on a standard laser printer. No special lighting is required. The camera produces good images in light levels as low as about 3 foot candles.

Figure 3:
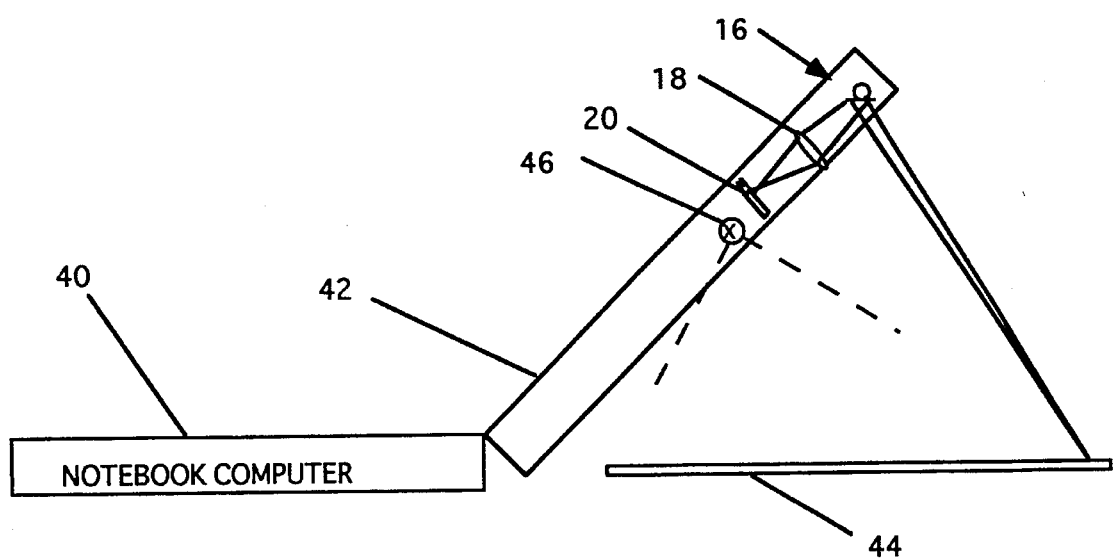
FIG. 3 is a drawing of an embodiment of the present invention for use with notebook type computers.

FIG. 3 shows this prototype device used as to scan document into a computer. In this embodiment the computer is a notebook computer 40 and the scanner is mounted on the back side of the LCD monitor 42. The document 44 to be scanned is placed in the position shown in FIG. 3. The locations of pivoting mirror 16, CCD line image sensor 20, and objective lens 18 are shown in FIG. 3. A small light may also be provided as shown at 46. The 3304×2340 pixel scan provides a very clear image with good enough resolution for document faxing applications. Text using 9 point standard type is easily read from the computer monitor or from a paper printout. This particular embodiment of my invention slightly distorts the image in both the vertical horizontal directions.

Images from my scanner can be transmitted from computer to computer over communication lines with no loss of quality in the usual manner. Thus, this prototype device can be used for telecommunication where communication of white board, document or poster information is needed. With this device a new black and white image can be transmitted over standard telephone lines at intervals of about 10 to 100 seconds depending on image content, modem speed and other factors. This limit is currently established by the modem data transfer rate. With my prototype device I can scan a new image in 5 seconds, so with better modems, the rate of transfer will improve. By using a linear CCD scanner with a higher data transfer rate and a faster pivoting mirror, the speed could be substantially increased.

Correcting for Distortion

For objects located at about 30 cm from mirror 16 maximum vertical distortion is about 3 percent and horizontal distortion is about 4 percent. For most purposes this should not be a problem. For scanning objects more than about 1 meter from the mirror, correction is not needed because distortion would not be obvious. If distortion is a problem it can easily be eliminated as follows:

Focus and Horizontal Distortion

Horizontal distortion is due to the fact that the distance D(N) from line N in the object plane to the mirror is not constant:

$$D(N) = \frac{D}{\cos(2\alpha(N))}$$

If F=the focal distance of objective lens, M=the distance from mirror to CCD sensor and K=the distance from CCD sensor to objective lens then:

$$1/F = 1/(D(N)+M-K) + 1/K.$$

To maintain objects in focus, the distance from the CCD sensor to the objective lens should be:

$$K(N) = \frac{D(N)+M}{2} - \sqrt{\frac{(D(N)+M)^2}{4} - F(D(N)+M)}$$

The image size reduction is equal to:

$$R(N) = (D(N)+M-K(N))/K(N)$$

The symbols used in the above equations are described graphically in FIG. 2.

In the embodiment shown there is a small amount of horizontal distortion in the computed image. This can be corrected in several different ways. A preferred method is to use software to effectively "shrink" every line of the image (except the edge ones) to the value $R(N)/R_0$ where $R_0$ is a reduction coefficient.

Another way to correct for horizontal distortion is to use a computer controlled zoom lens. The focal length would be approximated as follows:

$$Fm(N) = (D(N)+M)\left[\frac{1}{4} - \left(\frac{1}{2} - \frac{1}{R_0+1}\right)^2\right]$$

In the case of the embodiment discussed above for scanning documents, we would need a 38–40 mm zoom lens.

Vertical Distortion

Vertical distortion is due to the fact that the angles of the mirror between lines are equally spaced whereas the distances between the lines and the mirror are not. The easiest way to correct for this distortion is to use a rotary interrupter 12 that will generate pulses about 10 times more frequently than that specified for the embodiment described above. The electronic circuit is then programed to call for a scan at the appropriate angle to eliminate the vertical distortion. The dependence of mirror angle on line number will be:

$$\alpha(N) = (0.5)\arctan(L(N)/D(0)) = (0.5)\arctan\frac{(N)\Delta L}{D(0)}$$

where ΔL is the distance between the scan lines on the object being scanned.

Flexible Scanner

Unlike essentially all currently available scanners, the present invention can be used to scan documents close up and objects across the room or miles away. It can be incorporated into a interactive digital communication system to transmit images of documents, poster boards or people. The embodiments discussed above could provide new images at the rate of about one image each 5 seconds.

The images could be transmitted over normal telephone lines at the modem data transmission rate rate along with a sound track.

While the above description contains many specificities, the reader should not construe these as limitations on the scope of the invention, but merely as exemplifications of preferred embodiments thereof. Those skilled in the art will envision many other possible variations that are within its scope. For example, by using computer controlled automatic focusing of the camera, the focus can be adjusted as a page is scanned. To do this, we would utilize the equation for K(N) given above in the section entitled Correction for distortion. Accordingly the reader is requested to determine the scope of the invention by the appended claims and their legal equivalents and not by the examples which have been given.

I claim:

1. A low-cost high-resolution digital scanning camera for obtaining a digital image of objects within a field of view comprising:
   a) a linear CCD image sensor,
   b) a mirror,
   c) a lens for focusing onto said linear CCD image sensor, light reflected off said mirror from said field of view,
   d) a pivot means for pivoting said mirror through a scan angle so as to permit light from all points within said field of view to be focused on said linear CCD image sensor, and
   e) a notebook type computer for converting the output of said CCD image sensor into an image of said objects in said field of view, said notebook type computer comprising a monitor on which are mounted said linear CCD image sensor, said mirror, and said pivot means.

2. A scanning camera as in claim 1 wherein said pivot means comprises a servo motor.

3. A scanning camera as in claim 1 wherein said pivot means comprises a pair of elecrto-optic end position sensor means to limit the scan angle.

4. A scanning camera as in claim 1 and further comprising a control circuit means for controlling said pivot means and said linear CCD image sensor.

5. A scanning camera as in claim 1 and further comprising a means for correcting distortion in said image.

6. A scanning camera as in claim 5 wherein said distortion correcting means comprises a rotary interrupter and said computer means is programed to initiate scans at a variable rate based on signals from said rotary interrupter.

7. A scanning camera as in claim 1 and further comprising an auto focusing means to move said lens for focusing said camera on said objects.

8. A scanning camera as in claim 1 wherein said lens is a zoom lens.

9. A scanning camera as in claim 8 wherein said zoom lens is computer controlled.

* * * * *